United States Patent [19]

Bailey et al.

[11] Patent Number: 5,189,734
[45] Date of Patent: Feb. 23, 1993

[54] CELLULAR RADIO SYSTEM

[75] Inventors: Alister J. Bailey, Horley; Sunil K. Vadgama, Thornton Heath, both of England

[73] Assignee: U.S. Philips Corporation, New York, N.Y.

[21] Appl. No.: 855,160

[22] Filed: Mar. 20, 1992

Related U.S. Application Data

[63] Continuation of Ser. No. 438,287, Nov. 16, 1989, abandoned.

[30] Foreign Application Priority Data

Nov. 16, 1988 [GB] United Kingdom ............... 8826751

[51] Int. Cl.$^5$ .............................................. H04Q 7/02
[52] U.S. Cl. .................................. 455/33.2; 455/56.1; 379/60
[58] Field of Search ............. 455/33.1, 33.2, 33.4, 455/53.1, 54.1, 54.2, 56.1, 67.1; 379/58, 59, 60, 63

[56] References Cited

U.S. PATENT DOCUMENTS

| | | | |
|---|---|---|---|
| 4,485,486 | 1/1984 | Webb et al. | 379/60 |
| 4,578,815 | 3/1986 | Personetti | 455/33 |
| 4,670,899 | 6/1987 | Brody et al. | 379/60 |
| 4,718,081 | 1/1988 | Brenig | 379/60 |
| 4,797,947 | 1/1989 | Labedz | 455/56 |
| 4,811,380 | 3/1989 | Spear | 379/60 |
| 4,829,554 | 5/1989 | Barnes et al. | 379/58 |

OTHER PUBLICATIONS

The Bell System Technical Journal, Young et al., Jan. 1979, vol. 58 No. 1, pp. 15-95.

Primary Examiner—Reinhard J. Eisenzopf
Assistant Examiner—Lisa Charouel
Attorney, Agent, or Firm—Anne E. Barschall

[57] ABSTRACT

A cellular radio system in which a base station (BS1) establishing two way communication with a mobile (10) requests base stations (BS2 to BS7) of a subset of adjacent cells to reserve a channel so that in the event of handover to a base station in one of these cells this can be executed quicker than if the reservation had not been made. In making the request for reservation, the communicating base station (BS1) passes on details of the call-in-progress. Once call has been handed over a new subset of adjacent cells is created.

12 Claims, 2 Drawing Sheets

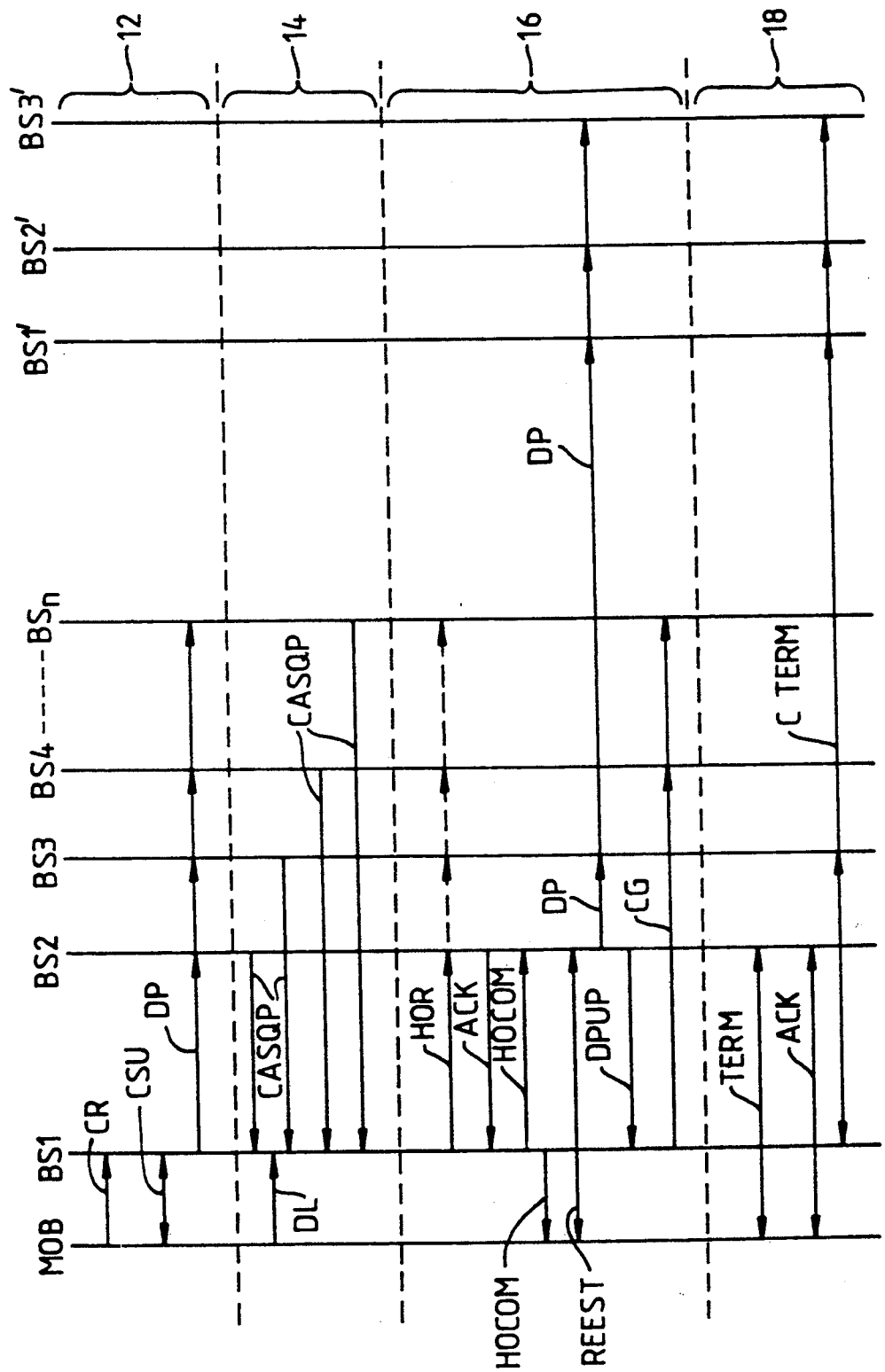

CELLULAR RADIO SYSTEM

This is a continuation of application Ser. No. 07/438,287, filed on Nov. 16, 1989 now abandoned.

DESCRIPTION

The present invention relates to a cellular radio system, particularly but not exclusively, to a system in which the cell sizes may be as small as 50 m radius.

A cellular radio system is a radio system which provides radio coverage over a large area by using a network of relatively short range (low power) base stations rather than using a single long range (high power) base station. The base stations are generally organised in a regular pattern over the area to define adjoining cells (typically of between 2 and 20 Km radius). Each user equipped with a mobile (which term includes a hand portable) transceiver is connected by a radio link to one of these base stations. When a user is moving around within a cell, he will possibly be moving further away from the base station through which he is communicating and correspondingly moving closer to one or more of the other base stations in adjoining cells. If the user moves so far away from the base station that he is becoming out of range then the system will reconnect him or "Handover" to a base station which he has been approaching. The system detects that a user is moving out of range of the base station through which he is communicating when the signal quality parameters deteriorate. When the system controller, termed the Mobile Switching Centre (MSC), detects that the signal quality parameters have fallen below acceptable levels it instructs all the base stations in the neighbourhood to inform it of the signal quality parameters received at that particular base station. A decision (usually based on the signal strength measurements) is then made by the MSC as to which adjacent cell should take the call. The call handover only takes place if the cell has a free channel and that the caller has adequate access authorisation. In currently used systems, radio network management functions including the call handover control are carried out by the MSC. This is a centrally controlled approach and enables the MSC to know what type of connection is required by a user together with other information such as charging account, charging rate in time units, the user's authorisation and so forth. Finally the MSC instructs the original base station to stop transmitting to, and receiving from, the mobile and instructs the selected base station to begin transmitting and receiving and makes a record of the transaction for system administration purposes. In practice several handovers are likely to occur especially if a mobile is moving in the vicinity of a boundary between two cells.

In order to provide sufficient capacity to cope with an increased demand and to make fuller use of the existing spectrum allocated for cellular radio systems it is anticipated that the future systems will comprise smaller cells, termed microcells, which may be as small as 50 m radius. Each microcell will have its own base station and groups of base stations will be managed by an associated network controller. By limiting the transmitting power of the base stations, more reuse of bands of designated radio channels by nearby microcells is possible in a given geographical area. However the provision of microcells brings with it problems of "handover" due to users passing from microcell to microcell very rapidly and their dropping-out due to the signal quality decreasing below an acceptable level in a matter of several seconds. This means an adjacent microcell will have to provide quickly a replacement radio channel in order to maintain call continuity. For microcells managed by the same network controller this rapid handover can be achieved relatively easily because it is already acquainted with the call details. However when adjacent microcells are managed by different network controllers then the call handover from one network controller to another network controller requires the interchange of a significant amount of data which will impose a large time-critical overhead on the system and perhaps limit the maximum speed with which a handover can be made.

An object of the present invention is to mitigate these problems in handover in microcellular radio systems.

According to a first aspect of the present invention there is provided a cellular radio system characterised by a plurality of geographically separate base stations distributed so as to define a plurality of contiguous radio cells, means for enabling the base stations to communicate with each other, at least one network controller for controlling a group of the base stations, each base station having means permitting two-way communication with a mobile present in its cell on a selected one of a plurality of radio channels, means, responsive to the establishment of two-way communication between a mobile and a base station on the selected channel, for requesting the base stations of a subset of cells, adjacent to the cell in which the mobile is presently in, to reserve a channel from the plurality of channels available to each of the base stations, and means responsive to the signal quality parameters of the communications between the base station and the mobile becoming unacceptable for handing over the mobile to a previously reserved channel in one of the subset of the adjacent cells.

According to a second aspect of the present invention there is provided a method of operating a cellular radio system comprising a plurality of geographically separate base stations distributed so as to define a plurality of continuous radio cells, means for enabling the base stations to communicate with each other and at least one network controller for controlling a group of the base stations, characterised in that when a mobile in one of said cells establishes two way communication with the base station of said one cell, said base station forms a subset of cells adjacent to its own cell by requesting the base stations of said subset of cells to reserve a channel in anticipation of handing over the communication with the mobile to one of the base stations of the subset in response to the signal quality parameters becoming unacceptable.

In an embodiment of the present invention the network controller or base station includes means for collating a statistical data base of handover traffic to and from each or its cell, said means being operative, in response to being requested to reserve a channel, to take its statistical data base into account when making a decision to comply with a cell reservation request. Said means can also estimate the period of time before a handover is required. Collating a statistical data base of handover traffic enables a more efficient use of the channels allocated to each cell. If for example it is known that a mobile follows a particular route from one cell to the next, then those base stations in the cells of each subset not lying on the particular route can assign a low priority to a reservation request whilst the cell(s)

of each subset lying on the particular route can assign a high priority to the reservation request. By being able to estimate the period of time before a handover is required, the actual reservation can be deferred until nearer the time required. In the meantime the channel is available to other users.

The present invention will now be described, by way of example, with reference to the accompanying drawings, wherein:

FIG. 2 is a diagram illustrating the signalling sequences involved in handover.

Figure 1:
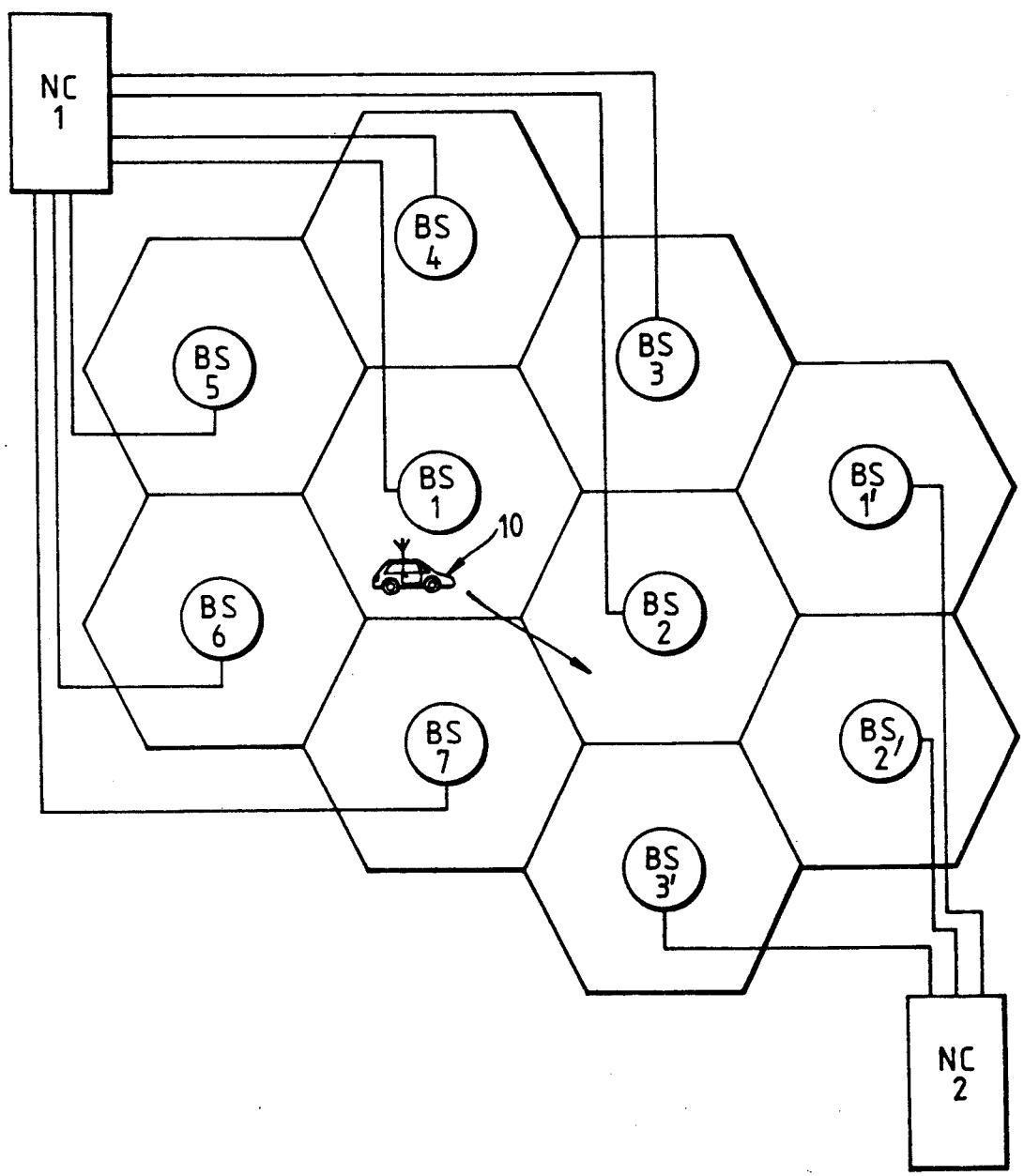
FIG. 1 is a diagram of a portion of a cellular radio system.

Referring to FIG. 1, the overall area to be covered by the radio system is subdivided into cells by positioning of base stations BS at different geographical locations. For convenience of illustration the cells have been shown as identical hexagons but in reality the cells will be non-uniform and the size of the cells in busy city areas will be smaller than those in rural areas. The smallest size of a cell will typically be of the order of 50 m radius.

The base stations in groups of cells are connected for example by land lines to a network controller NC which manages the operation of its group of cells. For the purposes of illustration the network controller NC 1 manages the base stations BS1 to BS7 and the network controller NC 2 manages BS1' to BS3'. Although not shown the base stations associated with a particular network controller may be interconnected as rings, stars, delta arrangements and/or meshes complete or incomplete.

Assuming that a mobile 10 is on a journey the route of which takes it through the cells having base stations BS1, BS2 and BS2'. Whilst in the radio range of BS1 the mobile 10 initiates a call by making a request to the base station BS1. As part of making the request the mobile sends its own identity, the called party's identity, and its own authentication code. This information is relayed from BS1 to network controller NC1 which checks details of the caller's service and cell authorisations and the caller's account, credit-worthiness and acceptable charging rates from the caller's home location register. Having established that this information is satisfactory, the network controller NC1 instructs the base station to set-up the call and the call proceeds on one of the speech channels allocated to BS1. Additionally, in anticipation of the mobile 10 moving out of its present cell, the NC1 passes details of the mobile 10 to the base stations BS2 to BS7 of a subset of adjacent cells and in response to these details each of the base stations BS2 to BS7 decides whether or not to reserve a channel from the group available to it. As the call continues and the mobile 10 proceeds to the edge of the cell defined by BS1, the base station BS1 monitors the signal quality parameters of the signals from the mobile 10 and when it is evident that communications are degrading beyond an acceptable quality, the network controller NC1 initiates a handover procedure which, in this example, is to base station BS2. As part of the handover process certain information, such as call duration, time the cell was entered, and time spent in the previous cells is transferred. Because other information about the calling party has already been stored in the network controller NC1, there is no need to transfer it. In consequence the time involved in handing the mobile 10 over from BS1 to BS2 is reduced and since the base station BS2 has already reserved one of its channels the call is transferred with the minimum of necessary time critical hand shaking. Network controller NC1 then instructs BS1 to stop transmitting to, and receiving calls from, the mobile 10 and in response to this instruction, the base station BS1 informs the base stations of its subset of cells that it is relinquishing its communication with the mobile 10. The base station BS2 creates a new subset of cells by informing its neighbouring base stations that it has taken over the communication with the mobile 10. In response to the signalling by the base stations BS1 and BS2, the base stations BS4, BS5 and BS6 may decide not to continue with reserving a channel. However as part of the operation required to form a new subset, the network controller NC1 communicates the necessary details relating to the mobile 10 to the network controller NC2 so that it can inform the base stations BS1', BS2' and BS3' of the fact that the base station BS2 is handling the call and that they can reserve a channel in view of the possibility of the mobile 10 entering one of their cells.

In the event, the mobile 10 enters the cell defined by the base station BS2' and because of the early registration of the mobile's call details with network controller NC2 (or the base station BS2') the handover can take place rapidly.

The concept of alerting base stations of cells adjacent to the cell in which a mobile is present has some other beneficial features. For example if a base station should fail while a mobile is passing through its cell, the network controller can arrange for base stations in the reserved adjacent cells to try and take over the call and avoid it being lost.

The foregoing example assumes a certain sharing of the management and switching functions between the network controllers and the base stations. However the manner of sharing these functions may differ to suit the application of the system and/or to suit the hieratical structure of the system.

In certain special situations for example where a mobile is proceeding along a part of a motorway not having any exits or where the user is on a train, the network controllers and/or base stations on determining this fact avoid reserving channels in those "adjacent" cells which it is predictable that the user will not pass. However as the mobile or train may be cruising at a relatively high speed, then the network controllers and/or base stations may form a subset of cells which are aligned with the route to be taken and because of the speed factor more than one cell ahead of the path of movement may be reserved so that successive handovers can be effected with the minimum of delay.

By the system being able to make use of knowledge of the direction of travel, it will also be able to warn a user of possible anticipated loss of service due to factors such as full cells, no cells or access denied. One method accomplishing this is for the forwarded user data to have a "distance from owner" tag associated with it. Such a tag would have its value changed every time it was forwarded, in anticipation of the forward speed being maintained, and have its value changed in the opposite sense as the user's time spent in successive cells decreases due to the user travelling faster. The value assigned to the tag could then be used to determine whether user and his call details have been forwarded by a reasonable amount. The value of the tag could also be used to give an indication of the power levels required for a base station of an adjacent cell to communicate with the user, should the need arise.

FIG. 2 represents some examples of the signalling involved in the system made in accordance with the present invention. The broken lines indicate the demarcations between different signalling modes, commencing at the top and working downwards, the bands 12 to 18 respectively comprise a call set-up mode, a channel monitoring mode, a call hand-over mode and a call termination mode. Referring to the band 12, a mobile MOB transmits a call request (CR) to its local base station BS1. The base station BS1 then sets-up a virtual circuit with the mobile MOB which is indicated by the double headed arrow CSU. When the circuit is set-up, that is the access rights have been determined and the call is connected through the network, the base station BS1 communicates a data packet DP comprising the call's description and requirement record to its adjacent cells having base stations BS2 to BSn. The call set-up procedure is now complete.

As the call continues the channel is monitored, band 14, by the base stations BS2 to BSn of the adjacent cells sending indications of channel availability and measurements of signal quality parameters CASQP to base station BS1. The mobile station MOB measures the signal quality parameters for the downlink DL, that is the transmissions from a base station, which the mobile station either relays to the base station BS1 or monitors itself until such time as handover is deemed to be necessary. This process will be repeated on a regular or irregular basis until a handover or call termination is required.

Referring to the band 16, when the base station BS1 decides that a handover is required, it sends a handover request HOR to the most suitable adjacent cell which has previously indicated that it has a channel available in this example the base station BS2. The destination base station BS2 then acknowledges ACK to BS1 that it can accept the call. The base station BS1 then transmits handover command signal HOCOM to the base station BS2 and to the mobile MOB. The call is then re-established REEST between the mobile MOB and the base station BS2. The BS2 then sends data packets DP to the base stations of those cells which form the neighbours to the cell in which the mobile MOB is present. In the case of the base station BS1, to reduce the information flow only an update data packet DPUP is sent by BS2 to it. Once the handover is complete BS1 transmits a call gone message CG to its original neighbouring cells. The system then reverts to its channel monitoring mode.

In the call termination mode 18, a call termination request TERM is issued by either the mobile MOB or the base station involved, in this example BS2, as a result of either party terminating the call. The recipient of the terminate request TERM acknowledges ACK the request and vacates the speech channel. The base station BS2 then informs the base stations of its subset of neighbouring cells that the call has been terminated CTERM, and that the network connection can be cleared down and that any reserved radio channels associated with that call can be released. Finally the caller is billed.

Distributing data in advance of handover to cells which are adjacent to the one in which the mobile is present has a number of other benefits besides facilitating a smooth handover. These other benefits include the instigation of signal quality parameters measurements at the earliest possible moment so that the system can be ready sooner for handover. Access rights between base stations can be established in advance. Base stations can monitor handover traffic from adjacent cells to collate a statistical data base of handover traffic flow to and from adjacent cells and user's mobility habits. With this knowledge, the base station can estimate the proportion of users likely to require handover from particular neighbours and the likely delay before the associated handover request is made. Using such information the base station can maintain and modify a pool of channels which are reserved against allocation to new calls in order that the system can cope with existing calls which it is anticipated will be transferred from one cell to the next. The network controller or base station can warn current users of an impending loss of service due to adjacent cells being full, cells which are temporarily out of use due to a fault in a base station or there are no adjacent cells in the estimated direction of travel. In the event of a base station failing, then those calls which have channels already reserved for their use in adjacent cells may have some chance of being recovered and continued. The call history in a call data packet will allow the network controller or base station to note a user moving rapidly through a succession of cells and if necessary to adjust the processing priorities.

We claim:

1. A method of operating a cellular radio system comprising a plurality of geographically separate base stations distributed so as to define a plurality of contiguous radio cells, means for enabling the base stations to communicate with each other, and at least one network controller for controlling a group of the base stations, the method comprising the steps of:
   establishing two way communication between a mobile in one of said cells and the base station of said one cell;
   forming a subset of said cells adjacent to the one cell; and
   requesting the base stations of said subset to reserve a channel for the communication in anticipation of handing over the communication with the mobile to one of the base stations of said subset, the handover being in response to signal quality parameters becoming unacceptable, said requesting occurring prior to the signal quality parameters becoming unacceptable.

2. A method as claimed in claim 1, comprising the additional step, on handover, by the base station which is taking over the communication with the mobile, of forming a new subset of said cells adjacent to the base station which is taking over.

3. A method as claimed in claim 1, comprising the additional step, on handover, by the base station with which the mobile was previously communicating, of transmitting at least to the base stations of the subset a message informing the base stations of the subset that the base station with which the mobile was previously communicating is relinquishing the communication.

4. A method as claimed in claim 1, comprising the additional steps by one of the network controller and base station of
   building up a call history of the mobile,
   determining that the mobile is moving along a predictable route, and
   forming predicted subsets of said cells, which predicted subsets are aligned with said route.

5. A method as claimed in claim 1, comprising the additional steps of:

detecting that the base station of said one cell is failing, and the network controller requesting at least one base station of said subset to take over the communication with the mobile.

6. A method as claimed in claim 1, comprising the additional step by the base stations of said subset of monitoring the signal quality parameters of the communications between the base station of said one cell and the mobile.

7. A method as claimed in claim 1 comprising the additional steps by the network controller of:

collating a statistical data base of handover traffic to and from a respective group of said cells, which group is controlled by the network controller;

taking the statistical data base into account; and making a decision to comply with a cell reservation request.

8. A method as claimed in claim 7, comprising the additional step by the network controller of estimating a period of time before the handover is required.

9. A method as claimed in claim 1 comprising the additional steps, by each base station of said subset, of collating a statistical data base of handover traffic to and from itself and in response to being requested to reserve the channel;

taking its statistical data base into account; and making a decision to comply with a cell reservation request.

10. A method as claimed in claim 9, comprising the additional step by each base station of said subset of estimating a period of time before the handover is required.

11. A method as claimed in claim 4 further comprising the steps of estimating a forward speed of said mobile along said predictable route;

assigning a "distance from owner" value to said mobile; and determining from said value a number of cells ahead of the one cell in which to reserve the channel.

12. A method for speeding up handover of a communication between a mobile station and a first base station to an adjacent base station comprising:

reserving a communication channel in each of a plurality of base stations adjacent to the first base station; and handing over the communication to a selected one of the plurality of base stations on the reserved communication channel when communication with the first base station is unacceptable, said reserving step occurring prior to the communication becoming unacceptable.

* * * * *